(12) United States Patent
Kimiabeigi et al.

(10) Patent No.: US 8,896,165 B2
(45) Date of Patent: Nov. 25, 2014

(54) GENERATOR, IN PARTICULAR FOR A WIND TURBINE

(75) Inventors: Mohammad Kimiabeigi, Sheffield (GB); Jean Le Besnerais, Mons en Baroeul (FR)

(73) Assignee: Siemens Aktiengesellschaft, Munich (DE)

( * ) Notice: Subject to any disclaimer, the term of this patent is extended or adjusted under 35 U.S.C. 154(b) by 47 days.

(21) Appl. No.: 13/153,522

(22) Filed: Jun. 6, 2011

(65) Prior Publication Data

US 2011/0309630 A1  Dec. 22, 2011

(30) Foreign Application Priority Data

Jun. 17, 2010  (EP) .................................. 10166309

(51) Int. Cl.
  *H02K 1/20*  (2006.01)
  *H02K 7/18*  (2006.01)
  *H02K 3/24*  (2006.01)

(52) U.S. Cl.
  CPC ................ *H02K 1/20* (2013.01); *Y02E 10/725* (2013.01); *H02K 3/24* (2013.01); *H02K 2213/12* (2013.01); *H02K 7/1838* (2013.01)
  USPC .................................. 310/54; 290/55; 310/58

(58) Field of Classification Search
  USPC ................... 310/54, 52, 58; 290/55
  See application file for complete search history.

(56) References Cited

U.S. PATENT DOCUMENTS

| | | | | |
|---|---|---|---|---|
| 3,435,262 A | * | 3/1969 | Bennett et al. | 310/54 |
| 4,710,664 A | * | 12/1987 | Cox et al. | 310/216.119 |
| 6,469,407 B2 | * | 10/2002 | Welke et al. | 310/58 |
| 6,822,352 B2 | * | 11/2004 | Nimz et al. | 310/58 |
| 6,975,051 B2 | * | 12/2005 | Groening et al. | 310/58 |
| 6,992,411 B2 | * | 1/2006 | Houle et al. | 310/52 |
| 7,309,931 B2 | * | 12/2007 | Hoppe | 310/12.29 |
| 7,548,008 B2 | * | 6/2009 | Jansen et al. | 310/266 |
| 7,719,129 B2 | * | 5/2010 | Hahlbeck | 290/55 |
| 2004/0135441 A1 | | 7/2004 | Groening et al. | |
| 2007/0024132 A1 | * | 2/2007 | Salamah et al. | 310/64 |
| 2009/0261668 A1 | * | 10/2009 | Mantere | 310/54 |
| 2010/0079016 A1 | * | 4/2010 | Hemmelmann et al. | 310/54 |
| 2010/0102649 A1 | | 4/2010 | Cherney et al. | |
| 2010/0102650 A1 | * | 4/2010 | Eriksen et al. | 310/54 |
| 2010/0102651 A1 | * | 4/2010 | Mohle et al. | 310/54 |

FOREIGN PATENT DOCUMENTS

| | | | |
|---|---|---|---|
| DE | 2515340 A1 | 9/1976 | |
| DE | 19742255 | * 11/1998 | ............... H02K 9/16 |
| DE | 10027246 C1 | 10/2001 | |
| DE | 102008029377 A1 | 12/2009 | |
| EP | 1257037 A1 | 11/2002 | |
| EP | 1416609 A2 | 5/2004 | |

* cited by examiner

Primary Examiner — Burton Mullins

(57) ABSTRACT

A generator is provided. The generator has a stator with teeth and slots for windings, a rotor rotatable around the stator, a plurality of permanent magnets, and a cooling pipe arranged beneath the slots. Further, a wind turbine with such a generator is provided.

14 Claims, 3 Drawing Sheets

GENERATOR, IN PARTICULAR FOR A WIND TURBINE

CROSS REFERENCE TO RELATED APPLICATIONS

This application claims priority of European Patent Office Application No. 10166309.4 EP filed Jun. 17, 2010, which is incorporated by reference herein in its entirety.

FIELD OF INVENTION

The present invention relates to a generator, in particular for a wind turbine, comprising a stator with teeth and slots for windings, a rotor, rotatable around the stator, with a plurality of permanent magnets, and a cooling means for dissipating heat.

BACKGROUND OF INVENTION

Wind turbines are provided with a rotor shaft which is part of an electrical generator producing electricity during a movement of the rotor relative to the stator of the generator. The stator comprises a number of coils or windings; the rotor comprises a number of permanent magnets so that an electric voltage is induced when the rotor is turned.

During rotation of the rotor a certain amount of heat is generated in the stator. For conventional wind turbines different cooling means are known. It has been proposed to use an air cooled ventilation system, a water cooled system, as well as heat pipes. In a water cooled system cooling pipes are employed between the windings of the stator in order to remove the generator teeth from the stator. However, such conventional water cooling systems are complicated and costly from the manufacturing and serviceability point of view, due to the difficulty of separating cooling pipes and the windings of the stator coils from one another. Furthermore the output torque of the generator is reduced due to the fact that the fill factor is reduced due to the cooling pipes. Alternatively the flux density in the stator yoke is reduced due to saturation.

SUMMARY OF INVENTION

It is therefore an object of the present invention to provide a generator with an effective cooling means which does not significantly affect the performance of the generator.

According to the present invention this object is achieved in the above defined generator in that the cooling means is formed as a cooling pipe arranged beneath the slots of the stator.

The present invention is based on the idea that the flux density is non-uniformly distributed in the stator laminations, yoke and teeth. As a result it has been found out that the areas of the stator beneath the slots can be used for cooling pipes in order to obtain a very efficient generator.

According to a preferred embodiment of the inventive generator the stator slot can comprise a cavity in which the cooling pipe is accommodated. When the cooling pipe is accommodated in a cavity the size and shape of the stator and of stator coils is basically unaffected so that the generator can be operated very efficiently.

According to the invention the cavity can have a substantially semi-circular or rectangular or triangular cross-section. All these different shapes of the cavity are appropriate for accommodating a cooling pipe. The outer shape of the cooling pipe is adapted to the shape of the cavity.

In particular it is preferred that the cooling pipe of the inventive generator is directly in contact with the windings of the stator coils. Due to the direct contact generated heat can be removed efficiently.

According to a preferred embodiment of the inventive generator the cooling pipe can be formed as a meander, comprising first sections beneath the stator slots and bent second sections connected to the first sections. When the cooling pipe has a meander shape the cooling liquid can pass multiple stator slots. The second sections can be bent radially, preferably perpendicular to the first sections. It is advantageous that the bent second sections are accessible for service.

In the inventive generator it can be envisaged that the second sections of the cooling pipe are arranged in radial ducts of the stator. The second sections of the cooling pipes can be arranged next to finger plates without increasing the size of the generator.

According to the invention the cooling pipe can be configured to cover one or more phases of the stator windings. Depending on the necessary amount of energy dissipation the cooling pipe can cover one, two or all three phases of the stator windings.

In a similar fashion the cooling pipe of the inventive generator can be configured to cover one or more stator slots in order to provide an efficient cooling for stator windings. As an example it can be envisaged that only every other slot is covered by a cooling pipe.

It is preferred that the cooling pipe of the inventive generator is made out of plastics or metal. In particular the cooling pipe can be made out of copper or stainless steel. In case the cooling pipe is made out of metal insulation can be provided between the cooling pipe and a stator lamination.

The cooling pipe of the inventive generator may contain a liquid coolant, preferably a coolant containing water or oil.

The invention and its underlying principle will be better understood when consideration is given to the following detailed description of preferred embodiments.

DETAILED DESCRIPTION OF INVENTION

Figure 1:
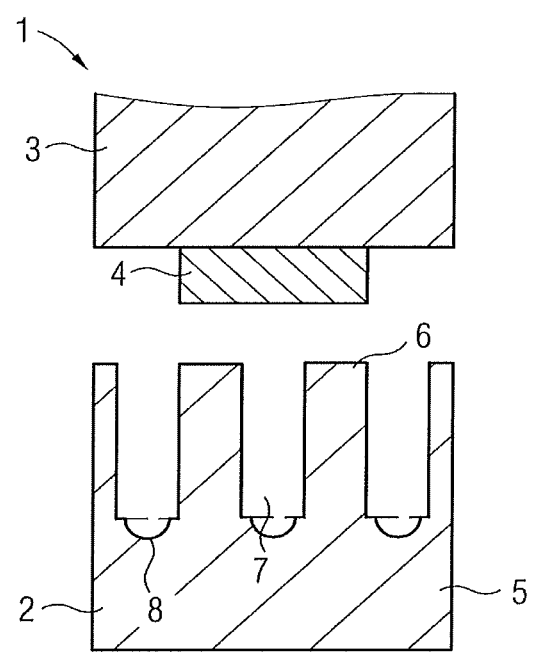
FIG. 1 is a sectional view of an embodiment of an inventive generator.

FIG. 1 is a sectional view of a generator 1 for a wind turbine. The generator 1 comprises a stator 2 and a rotor 3. The stationary stator 2 is usually incorporated in a nacelle which is positioned on top of a tower of the wind turbine. Rotor blades are fixed to the rotor 3, which is rotatably movable around the stator 2. Permanent magnets 4 are arranged in circumferential direction at the inner surface of rotor 3.

The stator 2 comprises a stator yoke 5 and a number of parallel teeth 6 extending from the outer surface of the stator yoke 5. The teeth 6 are arranged with a certain distance from each other, a gap or slot 7 is provided for stator windings, which are not shown in FIG. 1. When the rotor 3 is rotated electricity is generated in the windings which is accompanied by the generation of heat. In order to dissipate this heat cooling pipes 8 are provided beneath the slots 7. A coolant like water, oil or a coolant comprising water or oil flows through the cooling pipe 8 effectively removing the heat. In the embodiment shown in FIG. 1 the cooling pipe 8 has a semi-circular cross-section.

Figure 2:
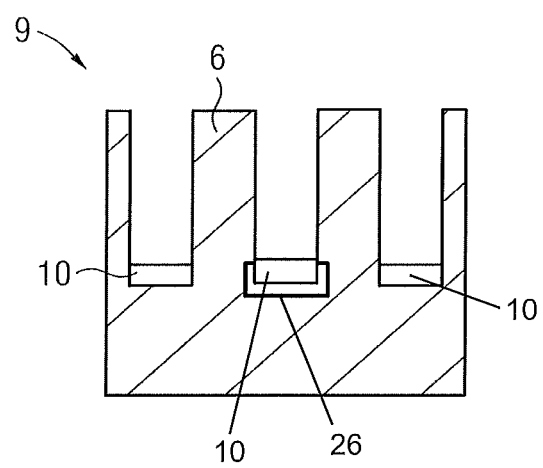
FIG. 2 is a sectional view of a second embodiment.

FIG. 2 shows another embodiment of a stator 9 which in general has the same structure as stator 2 of FIG. 1. However, in contrast to the first embodiment beneath the teeth 6 of stator 9 a cooling pipe 10 with a rectangular cross-section is provided. FIG. 2 also depicts a radial cooling pipe segment 25 extending from the axial cooling pipe 10. One embodiment may comprise insulation 26 surrounding the cooling pipe 10.

Figure 3:
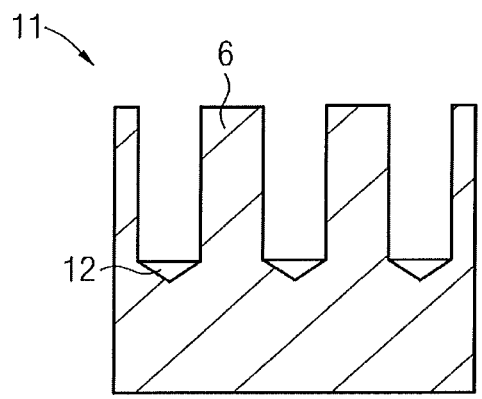
FIG. 3 is a sectional view of a third embodiment.

FIG. 3 shows another embodiment of a stator 11 which is provided with a cooling pipe 12 with a triangular cross-section.

Figure 4:
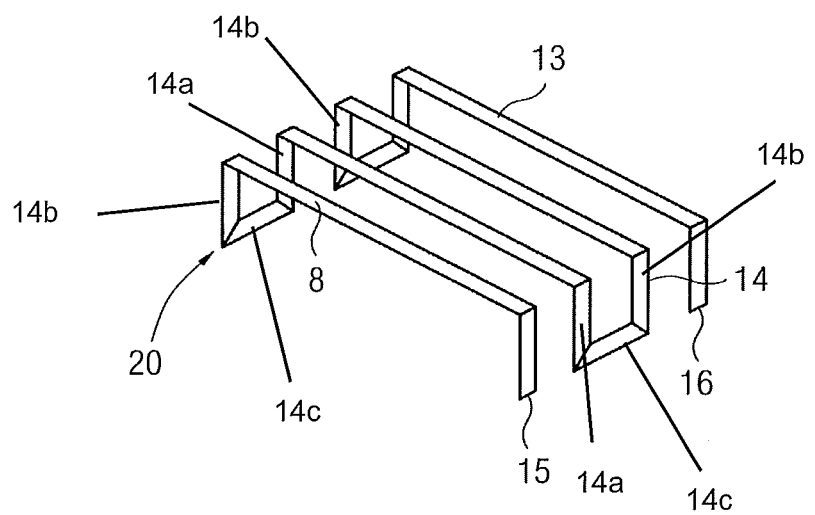
FIG. 4 is a perspective drawing of a cooling pipe.

FIG. 4 is a perspective drawing of a cooling pipe. As can be seen the cooling pipe 8 comprises first sections 13 which in the installed state are disposed beneath stator slots. The cooling pipe 8 comprises bent second sections 14, the bent second sections 14 may comprise U-shaped second sections further comprising a first leg segment 14a, a second leg segment 14b, and an interconnecting segment 14c, wherein the bent second sections 14 are bent perpendicular with regard to the first sections 13. Connections 20 are used for coupling first sections 13 and second sections 14. The cooling pipe 8 is formed as a meander so that it passes plural stator slots in circumferential direction. Further the cooling pipe 8 comprises an inlet 15 and an outlet 16. During manufacture of the generator the cooling pipes are first inserted in the cavities of the stator prior to the mantling of the windings. The fact that the cooling pipe comprises first sections and bent second sections simplifies the serviceability by having easier access to them.

Figure 5:
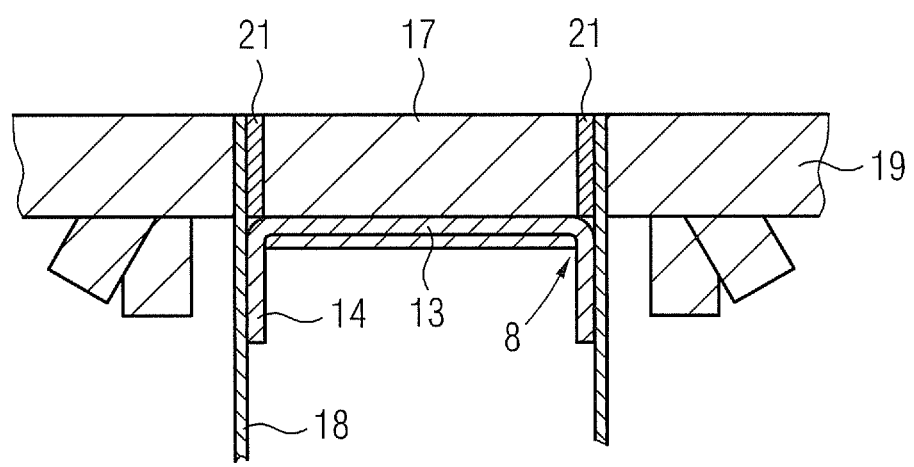
FIG. 5 is an axial sectional view of the stator of the generator of FIG. 1.

FIG. 5 shows an axial sectional view of the stator of the generator of FIG. 1. The first section 13 of cooling pipe 8 directly contacts the stator stack so that generator teeth can be cooled directly. The bent sections 14 of the cooling pipe 8 contact finger plates 18 which are provided on both sides of the stator. End windings 19 are protruding from both sides of the stator stack 17. Between the stator stack 17 and the finger plates 18 spacers 21 are inserted.

As can be seen in FIG. 5 the connections of sections of the cooling pipe 8 are accessible. In the embodiment of FIG. 5 the cooling pipe 8 is configured to cover all three phases and all slots of the stator. In other embodiments only one phase or only every other pole may be covered based on the cooling need and manufacturing simplicity and costs.

The invention claimed is:

1. A generator, comprising:
   a stator comprising a yoke having teeth therein and defining slots between the teeth for windings;
   a rotor, rotatable around the stator, with a plurality of permanent magnets; and
   a cooling pipe for carrying a fluid for dissipating heat,
   the cooling pipe formed as a meander and comprising axial first sections along a bottom surface of the slots such that the first sections are in contact with stator windings within the slots, and
   further comprising U-shaped second sections for interconnecting the first sections,
   the U-shaped second sections disposed at opposing axial ends of the stator and in contact with an inwardly facing surface of a finger plate disposed at opposing axial ends of the stator,
   each U-shaped second section comprising first and second leg segments each connected to an end of an interconnecting segment with a connection, and
   a spacer between each finger plate and the stator and extending radially outward from the U-shaped second section.

2. The generator according to claim 1, wherein the yoke comprises cavities in which the cooling pipe is accommodated.

3. The generator according to claim 2, wherein each cavity has a substantially semi-circular or rectangular or triangular cross-section.

4. The generator according to claim 1, wherein the second sections are disposed radially such that the second sections are substantially perpendicular with regard to the first sections.

5. The generator according to claim 1, wherein the second sections of the cooling pipe are arranged in radial ducts of the stator.

6. The generator according to claim 1, wherein a portion of the second sections of the cooling pipe is arranged next to the finger plates.

7. The generator according to claim 1, wherein the first sections are positioned to cover one or more phases of the stator windings.

8. The generator according to claim 1, wherein the cooling pipe is disposed along a bottom surface of one or more stator slots or every other slot.

9. The generator according to claim 1, wherein the cooling pipe comprises plastics.

10. The generator according to claim 1, wherein the cooling pipe comprises metal, further comprising copper or stainless steel.

11. The generator according to claim 10, wherein an insulation is provided between the cooling pipe and a stator lamination.

12. The generator according to claim 1, wherein the cooling pipe is filled with a liquid coolant containing water or oil.

13. The generator according to claim 1, wherein the second sections of the cooling pipe are arranged adjacent radial ducts of the stator.

14. A wind turbine, comprising:
   a generator, comprising:
      a stator comprising a yoke having teeth therein and defining slots between the teeth for windings;
      a rotor, rotatable around the stator, with a plurality of permanent magnets; and
      a cooling pipe for carrying a fluid for dissipating heat,
      the cooling pipe formed as a meander and comprising axial first sections along a bottom surface of the slots such that the first sections are in contact with stator windings within the slots, and
      further comprising U-shaped second sections for interconnecting the first sections,
      the U-shaped second sections disposed at opposing axial ends of the stator and in contact with an inwardly facing surface of a finger plate disposed at opposing axial ends of the stator,
      each U-shaped second section comprising first and second leg segments each connected to an end of an interconnecting segment with a connection, and
      a spacer between each finger plate and the stator and extending radially outward from the U-shaped second section.

* * * * *